(12) United States Patent
Jackson et al.

(10) Patent No.: US 7,767,162 B2
(45) Date of Patent: Aug. 3, 2010

(54) CONCENTRIC HOPPER AND BURN CHAMBER FOR SULPHOROUS ACID GENERATOR

(75) Inventors: Edward W. Jackson, Salt Lake City, UT (US); Franklin D. Johnson, Salt Lake City, UT (US)

(73) Assignee: Sweetwater License Holdings, LLC, Salt Lake City, UT (US)

( * ) Notice: Subject to any disclaimer, the term of this patent is extended or adjusted under 35 U.S.C. 154(b) by 862 days.

(21) Appl. No.: 10/795,972

(22) Filed: Mar. 8, 2004

(65) Prior Publication Data
US 2005/0196329 A1    Sep. 8, 2005

(51) Int. Cl.
*B01J 19/00* (2006.01)
*C01B 17/48* (2006.01)
*C01B 17/54* (2006.01)

(52) U.S. Cl. .................. 422/160; 422/161; 423/521; 423/543

(58) Field of Classification Search .............. None
See application file for complete search history.

(56) References Cited

U.S. PATENT DOCUMENTS

| 101,011 | A | * | 3/1870 | Hatschek | 423/521 |
| 197,474 | A | * | 11/1877 | Jones | 422/161 |
| 585,404 | A | * | 6/1897 | Porak | 261/36.1 |
| 911,328 | A | * | 2/1909 | Plank et al. | 431/342 |
| 961,662 | A | * | 6/1910 | Troutman | 431/331 |
| 1,086,275 | A | * | 2/1914 | Chinn | 431/341 |
| 1,421,232 | A | * | 6/1922 | Hinzke | 422/160 |
| 2,070,142 | A | * | 2/1937 | Scheu | 431/122 |
| 4,526,771 | A | * | 7/1985 | Forbush et al. | 423/543 |
| 6,080,368 | A | * | 6/2000 | Jackson | 422/161 |
| 6,506,347 | B1 | * | 1/2003 | Jackson | 422/161 |
| 7,141,220 | B2 | * | 11/2006 | Jackson | 422/161 |

* cited by examiner

Primary Examiner—Jennifer A Leung
(74) Attorney, Agent, or Firm—Locke Lord Bissell & Liddell, LLP

(57) ABSTRACT

This invention presents a sulphurous acid generator which employs a concentric hopper and burn chamber in which the burn chamber is surrounded or substantially surrounded by the hopper. The present invention also employs means for substantially eliminating any discharge plume.

16 Claims, 4 Drawing Sheets

CONCENTRIC HOPPER AND BURN CHAMBER FOR SULPHOROUS ACID GENERATOR

BACKGROUND OF THE INVENTION

1. The Field of the Invention

Only a fraction of the earth's total water supply is available and suitable for agriculture, industry and domestic needs. The demand for water is great and new technologies together with growing populations increase the demand for water while pollution diminishes the limited supply of usable water. The growing demand for water requires efficient use of available water resources.

Agricultural use of water places a large demand on the world's water supply. In some communities, the water supply may be adequate for farming but the quality of the water is unsuitable for agriculture because the water is alkaline. Alkalinity is an important factor affecting the quality, efficiency and performance of soil and irrigation water. A relative increase in irrigation alkalinity due to the water's sodium to calcium ratio or a high pH renders irrigation water detrimental to soil, crop growth and irrigation water efficiency. Such water can be reclaimed for soil rehabilitation and irrigation by adding lower pH sulphurous acid to the alkaline water to reduce its alkalinity or pH.

The invention of this application is directed toward a device which generates sulphurous acid in a simplified, efficient way. In particular, it is directed toward a sulphurous acid generator which produces sulphurous acid by burning sulphur to produce sulphur dioxide gas. The sulphur dioxide gas is then drawn toward and held in contact with water eventually reacting with the water and producing sulphurous acid, while substantially reducing dangerous emissions of sulphur dioxide gas to the air.

2. The Relevant Technology

There are several sulphurous acid generators in the art. The prior art devices utilize a variety of sulphur burn chambers and a variety of mechanisms for dissolving sulphur gases into water. However, many known systems utilize side-by-side hopper and burn chambers and/or countercurrent current flow, pressurized systems, and/or a single eductor arrangements as the principle means to accomplish the generation of sulphurous acid. For example, many devices employ the absorption tower to introduce the majority of the water to the system in countercurrent flow to the flow of sulphur dioxide gas. U.S. Pat. No. 4,526,771 teaches introducing 90% of the system water for the first time in countercurrent flow at the top of the absorption tower. In such devices, the integrity of the absorption towers is vital, and any deficiencies or inefficiencies of the absorption tower lead to diminished reaction and results. Other devices utilize pressurized gas to facilitate flow of gas through the system, see U.S. Pat. No. 3,226,201. Pressurized devices, however, require expensive manufacture to ensure the containment of dangerous sulphur dioxide gas to avoid leakage. Even negative pressure machines have the drawback of requiring a source of energy to power the negative pressure generator such as an exhaust fan. Still other devices rely upon secondary combustion chambers to further oxidize the sulphur, see U.S. Pat. No. 4,526,771. An earlier Harmon device utilized a single eductor in combination with a countercurrent absorption tower. The inventor has himself developed several different sulphur gas generators. U.S. Pat. Nos. 6,080,368, 6,248,299, 6,500,391, 6,506,347, and 6,689,326. Many sulphurous acid generators emit significant or dangerous levels of unreacted sulphur dioxide gas, a harmful and noxious pollutant, into the surrounding environment. Many devices discharge a visible plume or cloud.

SUMMARY AND OBJECTS OF THE INVENTION

The present invention is directed to a sulphurous acid generator employing a concentric hopper and burn chamber. The generator can be used to improve alkaline irrigation water by adding the sulphurous acid produced by the generator to alkaline water to reduce the alkalinity and/or pH of the water. In addition to making the water less alkaline, adding sulphurous acid to alkaline water increases the availability of sulphur in the water to act as a nutrient, improves capillary action of the soil, increases cation exchange capacity, and decreases tail water run-off and tillage and fertilizer costs.

In many agricultural settings, complicated farm machinery is not practical because it requires technical training to operate and special skills to service and maintain. For sulphur generators, improved design can reduce costs, simplify operation, service and maintenance and increase efficiency and safety thereby making the machine more practical for agricultural use. The present invention is directed toward a sulphurous acid generator that is simple to produce, operate, service and maintain, and which efficiency produces, contains and reacts sulphur dioxide gas and sulphurous acid without exposing the user or other living things in proximity to the machine to dangerous sulphur dioxide emissions.

It will be appreciated that a specific energy source is not necessarily required by the present invention, and therefore its use is not necessarily restricted to locations where a particular power source, like electricity, is available or can be generated for use. All of the above objectives are met by the present invention.

Unlike the prior art, the present invention is designed to manage the amount of water in contact with sulphur dioxide gas and the duration of the contact of water with sulphur dioxide gas without creating or minimizing back pressure in the system or relying upon pressurization of the gas to cause the sulphur dioxide gas to flow through the sulphurous acid generator. This reduces the complexity of the sulphurous acid generator and the need for additional equipment such as air compressors used by prior art devices.

The invention primarily relates to a concentric sulphur hopper and a burn chamber, a gas pipeline, a mixing tank, an exhaust pipeline, an exhaust chamber and a demister device.

The sulphur hopper preferably has a capacity to contain sulphur in powder, flake, split-pea or pastile form. The sulphur hopper can be constructed of various heat resistant materials or combinations thereof. In one embodiment, the sulphur hopper is constructed of stainless steel. In another embodiment the hopper is constructed of concrete such as SAGGREGATE™ concrete as taught in U.S. Pat. No. 6,689,326. The hopper can be any shape. Depicted in FIGS. 1, 2, 3, and 6 is a substantially cylindrical hopper. However, square, rectangular, oval, oblong, or other shapes may be used for the hopper.

Unlike prior art devices, the sulphur hopper of the present invention is disposed around the burn chamber so as to surround or substantially surround the burn chamber. The weight of the sulphur in the sulphur hopper in the flake or molten states is pulled downward by gravity toward an opening at the base of the burn chamber to provide a supply of sulphur for burning. The hopper has a removable lid or hatch to permit filling of the hopper with sulphur and to cover the supply of sulphur.

The burn chamber has an ignition inlet on the top of the burn chamber through which the sulphur is ignited and an air inlet through which air enters to fuel the burning sulphur. The burning sulphur generates sulphur gases such as sulphur dioxide gas. In the preferred embodiment, the top or lid of the burn chamber is removable, facilitating access to the chamber for maintenance and service. The burn chamber is constructed of material capable of withstanding the corrosiveness of the sulphur and the heat of combustion such as stainless steel or SAGGREGATE™ concrete. While the structure and function of both the hopper and the burn chamber are facilitated by a removable lid, in one embodiment, the lid of the hopper and the lid of the burn chamber are integral defining one lid to cover the concentric hopper-burn chamber structure.

Sulphur gases exit the burn chamber through an exhaust outlet on the top of the burn chamber and flows through a first conduit. The first conduit may be manufactured from stainless steel.

A supply of water is conducted by a second conduit and may be brought from a water source through the second conduit by any means capable of delivering sufficient water and pressure, such as an elevated water tank or a mechanical or electric pump.

The first conduit and second conduit meet to mix the sulphur gases and the water. Water flowing through the second conduit passes through a restricted portion of the length of the second conduit. The restricted portion creates a differential pressure across the restricted portion. The sulphur gases in the first conduit are draw into or passively injected into the flowing water at the point of differential pressure. The differential pressure draws or introduces sulphur gases into the water or fluid of the second conduit without the necessity of pressurizing the sulphur gas. The injector or restrictor introduces the sulphur gas(es) directly into the water subject to treatment. Undissolved sulphur gases downstream in the second water conduit are trapped in a vent stack. As the sulphur gases are drawn into the flow of water, the sulphur gases dissolve into the water to create an acid of sulphur thereby lower the pH or alkalinity of the water.

The present invention also contemplates the use of a blender to facilitate the further dissolving of sulphur gases into the water. The blender is placed down stream from the injector. The blender lies in the flow path of the water. The blender has fins over, around and through which water and undissolved sulphur gases are forced by the flow of water causing turbulent flow to mixing the sulphur gases and water.

If the sulphur gases are not directly injected or released into aqueous solution as discussed above, the first conduit and second conduit meet and couple with a third conduit as disclosed in the various structures, functions and uses described in U.S. Pat. Nos. 6,080,368, 6,248,299, 6,500,391, 6,506,347, and 6,689,326, which are incorporated herein by express reference.

The present invention also contemplates the optional use of a demister device. The demister device comprises a heated chamber. However, in some embodiments, the heated chamber requires no additional power or heat source. The demister device of the present invention is a housing constructed to provide means for capturing the radiant heat generated by the burn chamber and the first conduit. One embodiment of such means is a vertical housing whose lower portion is disposed about or above the burn chamber. In one embodiment, the demister housing releasably is attached to the lid of the burn chamber and the housing of the demister device surrounds a portion of the first conduit.

The housing defines an inlet connected to the vent stack conduit to receive the vapor or undissolved gases, if any, separated from the water discharging from the apparatus. The demister housing captures or contains the radiant heat generated by the apparatus. The captured radiant heat provides a heated chamber through which the vapors or undissolved gases pass and are heated and/or dried so as to substantially or entirely demist the vapors or gases, thereby substantially or entirely eliminating any visible exhaust plume from the apparatus. In another embodiment, auxiliary heat is/may also be used. Particularly, when the demister is some distance remote from the burn chamber.

It is an object of this invention to provide sulphur gas or a sulfurous acid generator that is simple to manufacture, use, maintain and service.

Another object of this invention is to provide on-site, on-demand sulphur gas generation avoiding the expense, equipment, hazardous material management and personnel needed by the prior art methods and apparatus.

Another object of the present invention is to provide sulphur gases or sulphurous acid for aqueous water treatment or landfill treatment methods.

Still another object of the present invention is to provide an effective, efficient, easy to use method and apparatus to dechlorinate water.

It is another object of this invention to eliminate reliance upon countercurrent absorption as the prior mechanism for creating sulphurous acid as taught by the prior art.

It is further an object of this invention to create a sulfurous acid generator that is capable of operating without any electrical equipment such as pumps, air compressor or exhaust fans requiring a specific energy source requirement, such as electricity or diesel fuels.

It is another object of this invention to produce a sulphurous acid generator which converts substantially all sulfur dioxide gas generated into sulphurous acid.

It is another object of the invention to produce a sulfurous acid generator which uses an induced draw created by the flow of water through the system to draw gases through the otherwise open system.

It is an object of this invention to produce a sulphurous acid generator which substantially eliminates emission of harmful sulphur dioxide gas.

It is another object of the present invention to provide a sulphurous acid generator with means for conditioning intake air prior to combustion in the sulphur burner.

Another object of the present invention to provide a sulphurous acid generator with means for conditioning intake air prior to combustion in the sulphur burner without requiring an additional heat or power source.

Another object of the present invention is to provide a sulphurous acid generator with means for substantially eliminating any visible discharge or exhaust plume from the apparatus.

Another object of the present invention is to provide a sulphurous acid generator with means for substantially eliminating any visible discharge or exhaust plume from the apparatus without requiring an additional heat or power source.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly depicted above will be rendered by reference to a specific embodiment thereof which is illustrated in the appended drawings. With the understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 6:
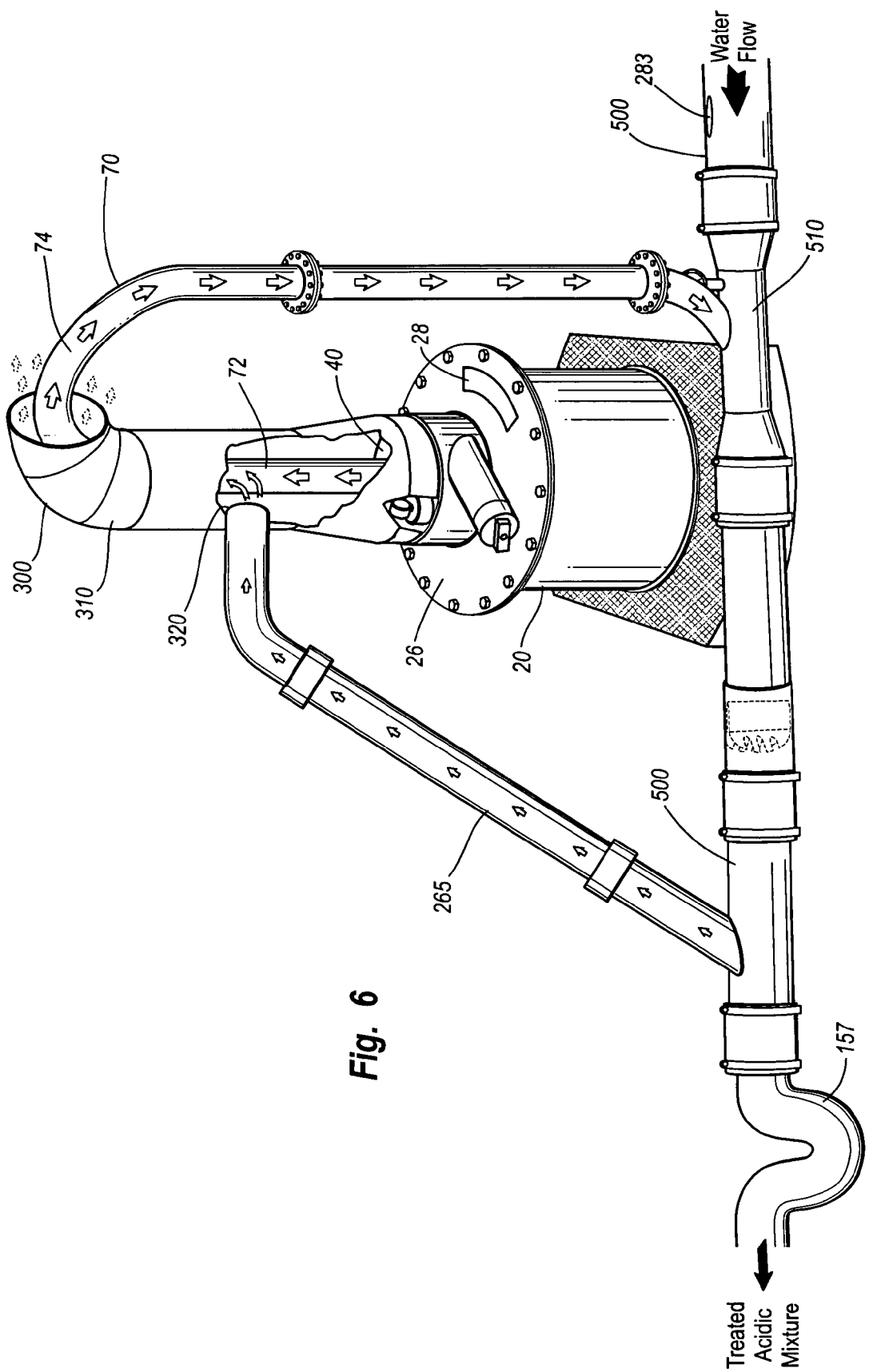
FIG. 6 is a partially broken away view of the demister.

Including by reference to the figures listed above, applicant's sulfurous acid generator comprises a concentric hopper-burn chamber which generates sulphur dioxide gases and mixes the sulphur gases with water as depicted in FIGS. 1-5. The structure and function of a demister is shown in FIG. 6.

Figure 1:
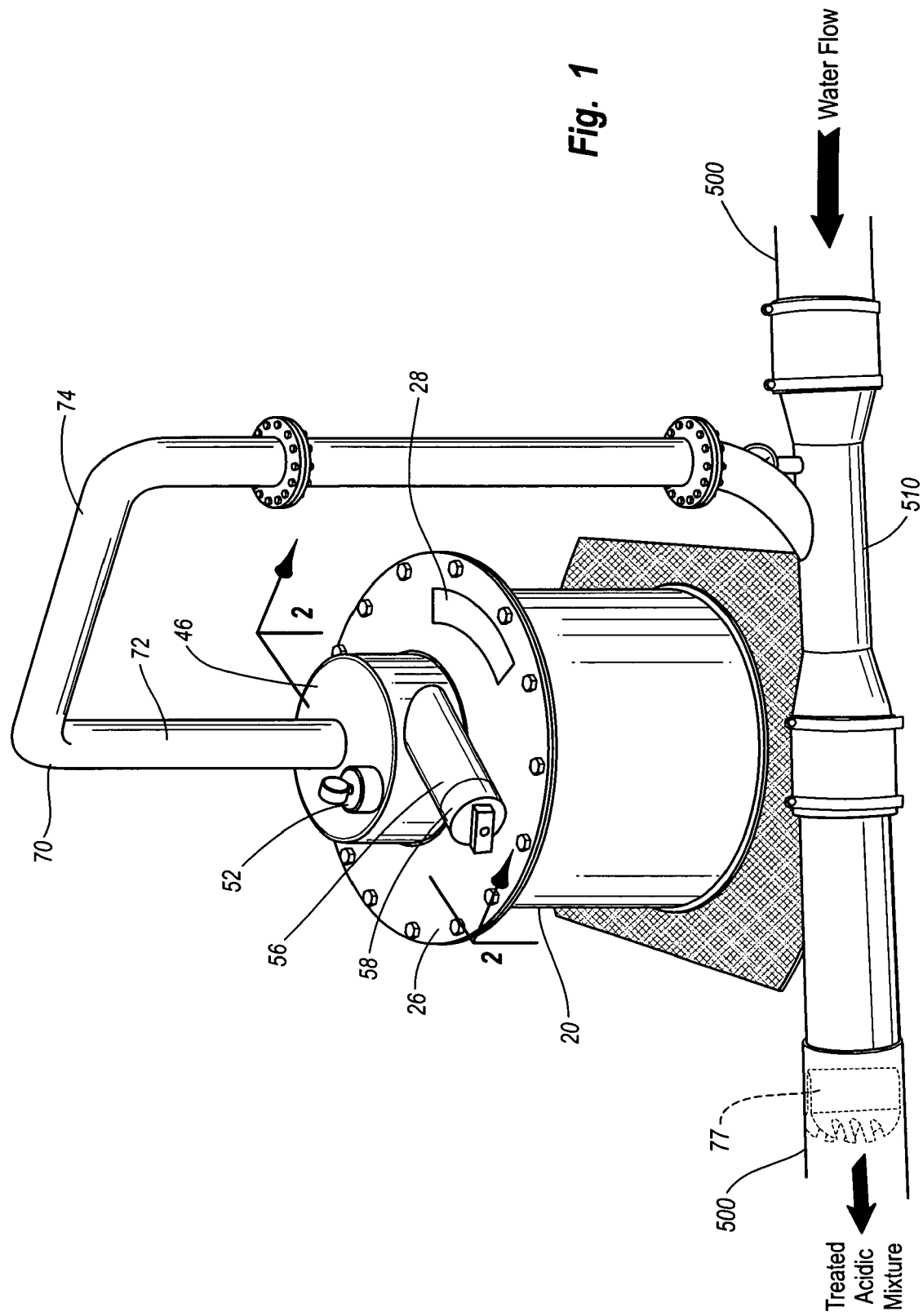
FIG. 1 is a perspective view of one embodiment of the sulphurous acid generator apparatus of the present invention.
Figure 2:
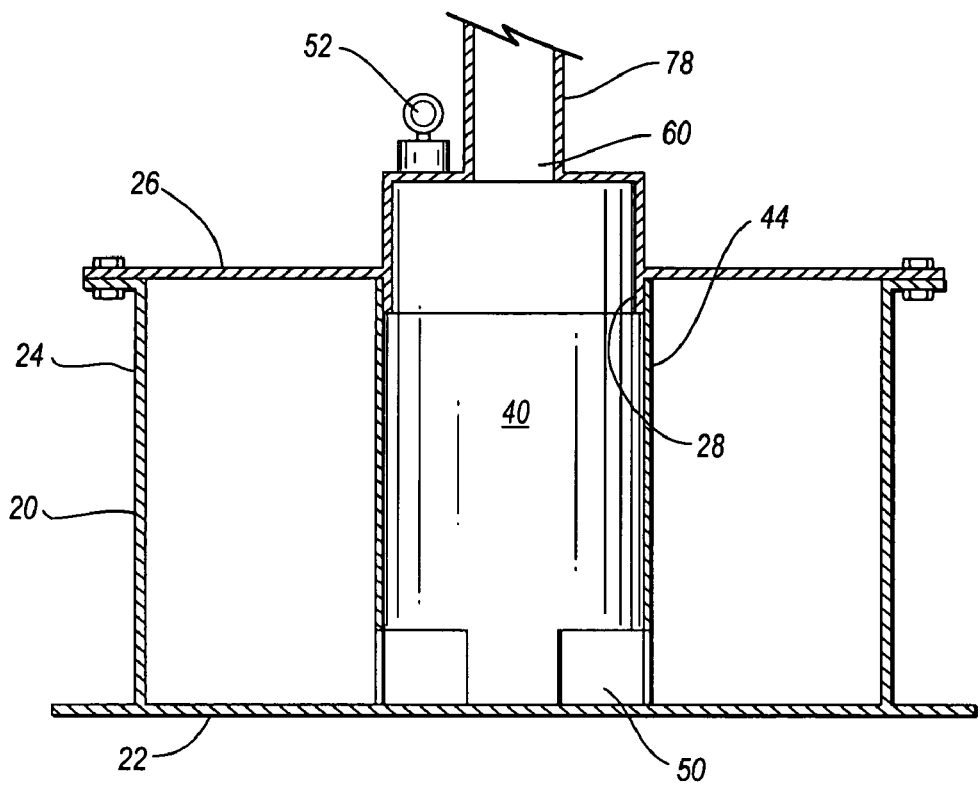
FIG. 2 is a cross-sectional view of FIG. 1 along line 2-2 showing the hopper and burn chamber without sulphur.
Figure 3:
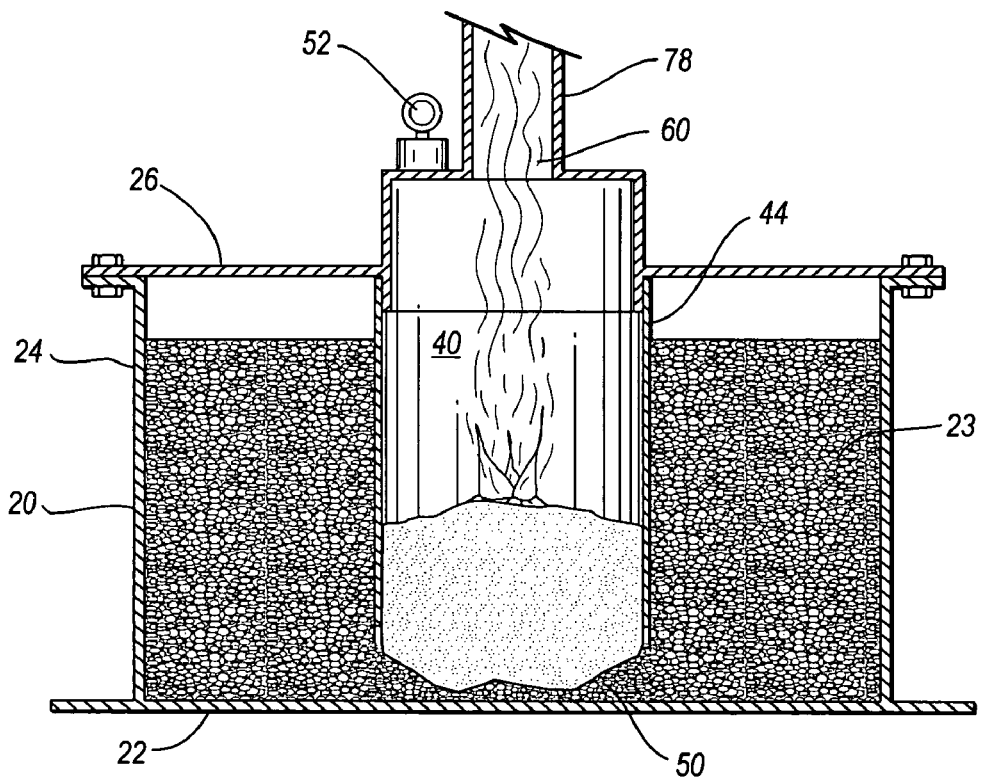
FIG. 3 is a cross-sectional view of FIG. 1 along line 2-2 showing the hopper and burn chamber with sulphur and ignited.
Figure 4:
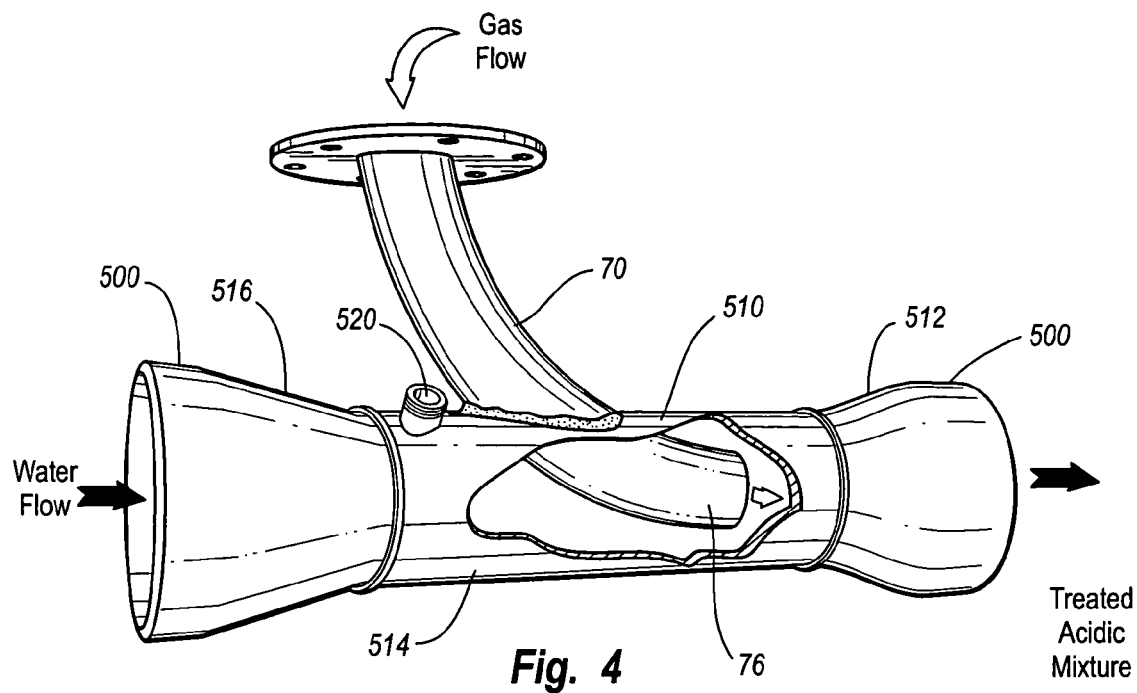
FIG. 4 is a partially broken away, perspective view of the injector.
Figure 5:
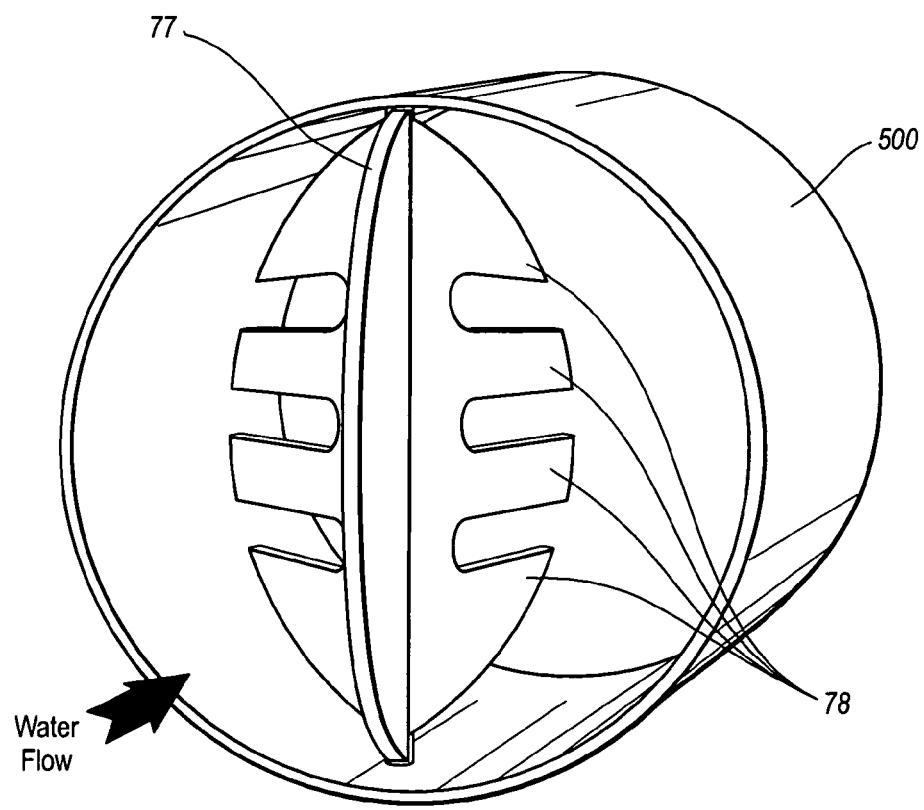
FIG. 5 is a perspective view of the blender.

The sulphur hopper 20 comprises an enclosure for sulphur 23. FIGS. 2 and 3 depict hopper 20. Hopper 20 may be of any geometric shape. In the embodiment shown in FIGS. 1, 2, 3 and 6, a cylindrical shape is employed. Hopper 20 comprises a base or floor 22 and sidewall 24. While sidewall 24 is depicted in the Figures as being substantially vertical, it is contemplated that sidewall 24 could be sloped from top to bottom. Lid 26 is disposed over hopper 20. Lid 26 is removable to permit loading of sulphur and servicing of the hopper. In an alternative embodiment, lid 26 can be fashioned with a hopper hatch 28. FIG. 1. Hatch 28 can be opened and closed to permit sulphur to be loaded into hopper 20.

Burn chamber 40 comprises floor member 22, chamber sidewall 44 and lid 26. Lid 26 is removably attached to chamber sidewall 44. Lid 26 defines an ignition inlet 52 for access the sulphur for lighting. An air inlet 56 defined by lid 26 and has a removably attached air inlet cover 58. The air inlet 56 preferably enters the chamber sidewall 44 tangentially. Burn chamber exhaust opening 60 is defined by lid 26.

Burn chamber sidewall 44 also defines burn chamber inlets 50 disposed about the base of sidewall 44. Inlets 50 are passageways communicating between the enclosure of hopper 20 and burn chamber 40. Sulphur contained in hopper 20 moves by gravity downward. Molten sulphur occupies the bottom of burn chamber 40, the heat of the molten sulphur permits the reservoir of sulphur to migrate through inlets 50 to provide further sulphur for combustion.

As shown in FIGS. 2 and 3, lid 26 also defines a downwardly extending annular ring 28. In one embodiment, ring 28 extends downwardly into burn chamber 40. Lid 26 is secured to sidewall 24 of hopper by either releasably bolting lid 26 to hopper 20, by employing removable C-clamps, or any other releasable means for securing lid 26 is place.

Sulphur in burn chamber 40 can be ignited through the ignition inlet 52. The air inlet 56 allows oxygen, necessary for the combustion process, to enter into the burn chamber 40 and thus permits regulation of the rate of combustion. The present invention also contemplates a means for controlling the burn rate of sulphur in burn chamber 40. FIGS. 8A through 8E of U.S. Pat. No. 6,689,326, the disclosure of which is incorporated herein by express reference, represent different means for dampening air intake through air inlet 56. The exhaust opening 60 allows the sulphur dioxide gas to pass up through the exhaust opening 60 and into gas pipeline 70.

Gas pipeline 70 has two ends, the first end 78 communicating with the exhaust opening 60, the second end 76 terminating inside injector 510. The gas pipeline or first conduit 70 may comprise an ascending pipe 72 and a transverse pipe 74. The ascending pipe 72 transitions to transverse pipe 74. Pipe 70 terminates at end 76.

Water is conducted through a second conduit or water line 500. Restrictor 510 is coupled to line 500. Restrictor 510 reduces the diameter of the pipe through which water is flowing over a length 512. A length 514 of restrictor 510 encloses pipe end 76. Another length 516 of restrictor 310 enlarges the diameter of the pipe through which water is flowing. The structure of restrictor or injector 510 and the flow of water through it creates a differential pressure which draws sulphur gases in gas pipe 70 into the water flowing through restrictor 510 without the necessity of pressurizing the sulphur gas. This permits sulphur gases to dissolve in the water. In another embodiment, the injector 510 may be a MAZZEI™ Injector made by Mazzei Injector Corporation, Bakersfield, Calif., United States of America. The devices and function of FIGS. 1, 4 and 6 described herein provide means for passively introducing or injecting sulphur gases into a pressurized fluid line.

To further facilitate the mixture of sulphur gases and water, and the dissolution of sulphur gases in the water, blender 77 is disposed in water line 500 downstream from injector 510. Blender 77 comprises fins 78. Water and sulphur gases flowing around and over fins 78 cause turbulent flow within pipe 500, thereby further mixing water and sulphur gases to encourage dissolution of sulphur gases into the water.

Pipe 500 is adapted with u-trap 157. U-trap 157 acts as means to trap and force undissolved gases, if any, into vent stack 265. U-trap 157 prevents undissolved gases from exiting the pipe 500 in any significant amount. Remaining undissolved gases in the system rise through vent stack 265.

The present invention further comprises a device for eliminating or substantially eliminating visible gases and/or vapors generated by the apparatus by drying, or reducing or substantially reducing the moisture content of, the gases and/or vapors in vent stack 265. This is accomplished by reducing the moisture content of the gases. In practice, sometimes the gases and/or vapors generated by the apparatus produce a visible plume or cloud discharged from the apparatus. The present invention includes means for substantially eliminating any discharge plume.

An example of means for substantially eliminating any discharge plume comprises a demister chamber 300 comprising a housing or sidewall 310. Housing 310 substantially surrounds or encases the top of burn chamber 40 and a portion of ascending pipe 72 to contain or capture radiant heat generated or created by burn chamber 40 and pipe 72 while permitting entry of air at a lower opening 312 of housing 310 to permit a chimney effect of rising air upward through chamber 300. Opening 312 also permits access to ignition inlet 52.

Housing 310 can have one or more flat sides or rounded sides. Housing 310 or portions of housing 310 can be enlarged or reduced in size relative to size of the burn chamber. The housing 310 may be constructed of any suitable material(s) or insulated material(s) capable of withstanding the significant temperatures associated with burn chamber 40 and pipe 72 when the apparatus is operating. The temperature of the heat in housing 310 is a temperature above the ambient temperature of the environment in which housing 310 is located.

The housing 310 defines an inlet 320 at which housing 310 can be coupled to vent stack 265. As the gases and/or vapors exit vent stack 265 and enter demister chamber 300, the heat within demister chamber 300 dries or reduces the moisture content of the gases and/or vapors eliminating or substantially eliminating any visible discharge plume discharging from the apparatus. As revealed by the structure of demister chamber 300, no additional heat or power source is needed. If the radiant heat of the apparatus is insufficient to adequately eliminate any discharge plume, a supplemental heat source such as heated coils, not shown, could be disposed inside housing 300 powered by an auxiliary power or heat source (not shown). Any conventional, equivalent heat source may be used. Similarly, a auxiliary heat source could comprise heat coils, wires or cords wrapped around housing 300; this would be particularly effective for a housing of small cross-section.

In another embodiment, drying gases and vapors exiting vent stack 265 is particularly contemplated when an air injector 283 is utilized. FIG. 6. As disclosed in U.S. Pat. No. 6,500,391, and incorporated herein by express reference, air injector 283 disperses additional air into the water. The preferred air injector is the MAZZEI® Injector from Mazzei Injector Corporation, Bakersfield, Calif., United States of America.

All of the foregoing burner chamber configurations permit the user to generate needed sulphur gases on-site thereby avoiding the costly purchase, transportation, and containment of preexisting sulphur gas delivery systems.

Therefore, as illustrated, the present invention contemplates and discloses a variety of means for substantially eliminating any discharge plume or cloud often associated with exiting gases and/or vapors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A sulphurous acid generator apparatus comprising:
a burn chamber in which to combust solid sulphur, the burn chamber comprising one or more sidewalls, a base, a lid, and a gas outlet;
a hopper to hold solid sulphur to be combusted, the hopper comprising one or more sidewalls, a base, and a lid, wherein the sulphur hopper substantially surrounds the burn chamber;
a first conduit connected to the gas outlet for conducting sulphur dioxide gas;
a second conduit for conducting a stream of water; and
means for passively introducing the sulphur dioxide gas conducted in the first conduit into the stream of water in the second conduit.

2. The sulphurous acid generator of claim 1 further comprising means for substantially eliminating any discharge plume by reducing moisture content of gases and vapors exiting the apparatus.

3. A sulphurous acid generator apparatus, wherein the sulphurous acid generator combusts sulphur creating radiant heat of and about the apparatus, the apparatus generating a discharge of gases and/or vapors including moisture causing a visible discharge plume, the improvement comprising:
a burn chamber in which to combust solid sulphur, the burn chamber comprising one or more sidewalls, a base, a lid and a gas outlet;
a hopper to hold solid sulphur to be combusted, the hopper comprising one or more sidewalls, a base and a lid, wherein the sulphur hopper substantially surrounds the burn chamber; and
means for substantially eliminating any discharge plume.

4. The apparatus of claim 3 where the means for substantially eliminating any discharge plume reduces the moisture content of the discharge.

5. The apparatus of claim 3 wherein the means for substantially eliminating any discharge plume utilizes the radiant heat created by the apparatus to reduce moisture content of the discharge.

6. The apparatus of claim 3 wherein the means for substantially eliminating any discharge plume comprises a heated housing through which exiting gases and vapor flow.

7. The apparatus of claim 6 wherein the housing is heated by the radiant heat created by combustion of sulphur in the apparatus.

8. A sulphurous acid generator apparatus comprising:
a combustion chamber in which to combust solid sulphur, the combustion chamber comprising one or more sidewalls, a base, a lid and a gas outlet;
a hopper to hold solid sulphur to be combusted, the hopper comprising one or more sidewalls, a base and a lid, wherein the sulphur hopper substantially surrounds the combustion chamber;
a first conduit connected to the gas outlet for conducting sulphur dioxide gas; and
a second conduit for conducting a stream of water, the second conduit comprising a restrictor,
wherein the first conduit extends into the restrictor so as to both point and terminate downstream in the restrictor.

9. A sulphurous acid generator apparatus comprising:
a burn chamber in which to combust solid sulphur, the burn chamber comprising one or more sidewalls, a base, a lid and a gas outlet;
a first conduit connected to the gas outlet for conducting sulphur dioxide gas; and
a second conduit for conducting a stream of water, the second conduit comprising a restrictor,
wherein the first conduit extends into the restrictor so as to both point and terminate downstream in the restrictor; and means for substantially eliminating any discharge plume by reducing a moisture content of gases and vapors exiting the apparatus.

10. The apparatus of claim 9 wherein the means for substantially eliminating any discharge plume utilizes radiant heat created by the apparatus to reduce a moisture content of the discharge.

11. The apparatus of claim 9 wherein the means for substantially eliminating any discharge plume comprises a heated housing through which exiting gases and vapors flow.

12. The apparatus of claim 11 wherein the housing is heated by radiant heat created by combustion of sulphur in the apparatus.

13. A method for using a sulphurous acid generator apparatus, the method comprising:
contacting water with sulphur dioxide gas in a sulphurous acid generator apparatus to produce a treated acidic water, wherein the sulphurous acid generator apparatus comprises:
a combustion chamber in which to combust solid sulphur, the combustion chamber comprising one or more sidewalls, a base, a lid and a gas outlet;
a hopper to hold solid sulphur to be combusted, the hopper comprising one or more sidewalls, a base and a lid, wherein the sulphur hopper substantially surrounds the combustion chamber;
a first conduit connected to the gas outlet for conducting sulphur dioxide gas; and a second conduit for conducting a stream of water, the second conduit comprising a restrictor, wherein the first conduit extends into the restrictor so as to both point and terminate downstream in the restrictor.

14. The method of claim 13 wherein the combustion chamber further comprises means for substantially eliminating any discharge plume, the means comprising reducing moisture content of gases and moisture exiting the apparatus.

15. The method of claim 13 further comprising irrigating crops with the treated acidic water.

16. The method of claim 15 further comprising allowing the crops to take up sulphur from the treated acidic water.

* * * * *